Feb. 7, 1967    C. F. HENNECKE ET AL    3,302,460
TEMPERATURE GAUGE
Filed Nov. 17, 1964
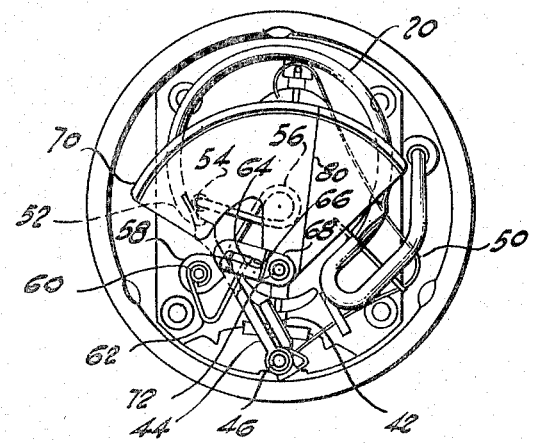
FIG.3.
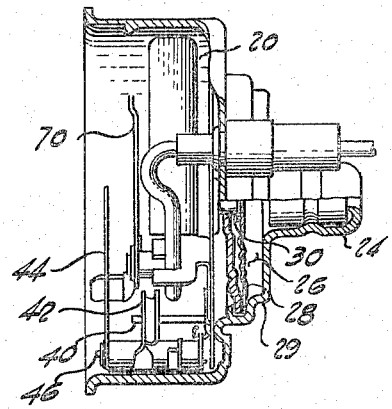
FIG.4.
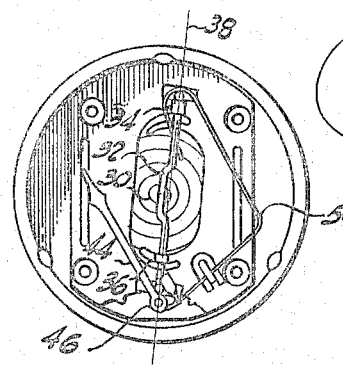
FIG.5.
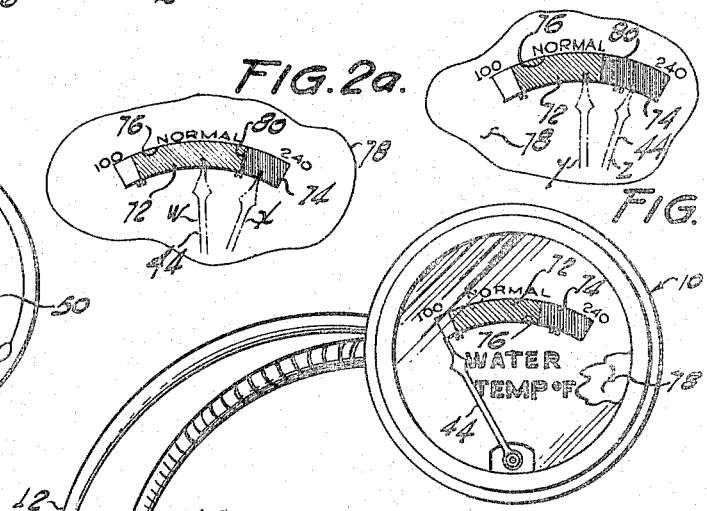
FIG.2a.
FIG.2b.
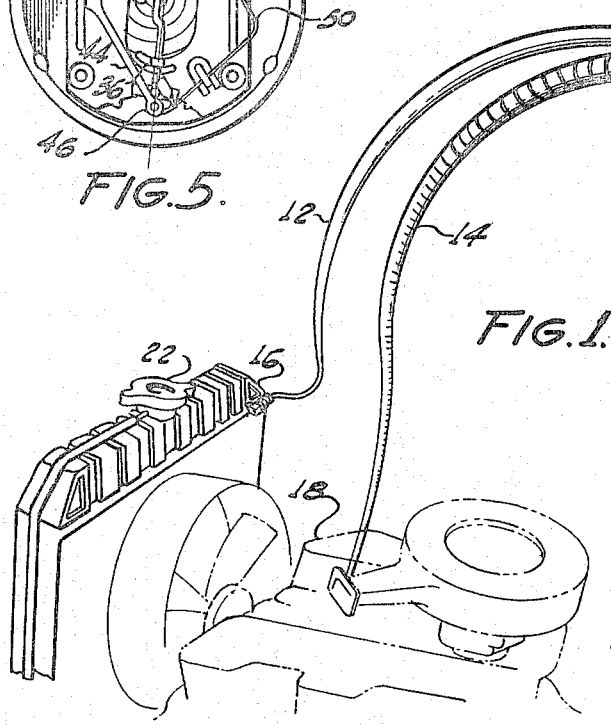
FIG.1.
INVENTORS
Charles F. Hennecke
Irwin E. Mather.
By *William J. Newman*
Attorney

# United States Patent Office 3,302,460
Patented Feb. 7, 1967

3,302,460
TEMPERATURE GAUGE
Charles F. Hennecke, Oak Park, Ill., and Irwin E. Mather, Berryville, Ark., assignors to Stewart-Warner Corporation, Chicago, Ill., a corporation of Virginia
Filed Nov. 17, 1964, Ser. No. 411,757
4 Claims. (Cl. 73—345)

This invention relates to temperature indicating devices and more particularly to temperature indicating devices which also register safe operating ranges such as used with liquid-containing, pressure-type system applicable to cooling internal combustion engines, or the like.

Generally these types of cooling systems are pressure sealed in order that the coolant won't boil at the normal operating temperatures of the engine. Thus, the engines may normally be operated at higher loads without fear of overheating, increasing its operating efficiency.

Occasionally the sealed cooling systems lose their seal for one reason or another and the coolant returns to normal barometric pressure. This might be caused by a defective radiator pressure cap, gasket failure, hose leak or many other causes. If caused by means such as a defective radiator pressure cap, which does not cause draining of the coolant, the engine may continue in operation providing the engine load is maintained at a level below that which would boil the coolant at normal ambient pressure.

It is a specific object of this invention to provide a gauge for indicating a safe temperature operating range which gives a true reading whether or not the system is properly pressure sealed. Generally if the pressure seal is in proper order the safety range may extend up to a maximum of 240° F., but if the pressure seal is faulty the safe range may extend to a maximum below 212° F.

Ordinarily the safety range is marked on the gauge to have a maximum under one condition or the other. If the safety range is marked up to 240° F., a safe indication will be given even at temperatures above 212° provided the pressure is maintained in the system. However, if the pressure is lost, the coolant temperature must be maintained below the normal ambient boiling temperature or damage will occur to the engine.

On the other hand if the safe range is marked to the lower range with a maximum temperature somewhat below 212°, the gauge will indicate an unsafe temperature level whenever the pressure seal is intact and the engine is operating at a high load level at which the temperature is above normal ambient boiling point but below the pressurized boiling point. The operator, by his observation of a gauge reading above the safe range would have to shut down the engine even through it might be operating properly. This of course creates undue operating expenses since the machine is shut down while it could still be operated to accomplish its purpose.

It is an object of this invention to provide a gauge for indicating the safe operation of a liquid-containing, pressure-tight system.

It is also an object of this invention to provide a gauge for indicating the coolant temperature of a normally pressure tight system and for giving an indication of the safe operation of the system even though the system may lose its pressure.

Other objects and advantages of this invention will become readily apparent upon a further reading of this specification, especially when taken in view of the accompanying drawings in which:

FIG. 1 is a face view of a gauge including its connections to an internal combustion engine;

FIGS. 2a and 2b are fragmentary views of the face of the gauge showing the indicator relationships for different conditions being observed;

FIG. 3 is a detailed elevation of the inner mechanism of a gauge embodying this invention;

FIG. 4 is a side view partially in section of the gauge shown in FIG. 3;

FIG. 5 is a fragmentary view of the temperature indicating mechanism in the gauge of FIGS. 3 and 4.

Briefly, a device embodying this invention comprises an indicator, such as a pointer with means for moving the pointer responsive to changes in the temperature of the liquid in the pressure tight system. Indicia means are provided which are separately movable respective to the pointer and which are operated by means responsive to pressure changes in the system. Thus, the pointer will indicate with the indicia means satisfactory operation of the system at one temperature and indicate satisfactory operation when a pressure change has occurred within the system at a different temperature.

Referring now to FIG. 1, there is shown a gauge 10 with connections 12 and 14 to the radiator 16 and engine block 18, respectively. The connection 12 to the radiator 16 is a tubular conduit which affords communication between the radiator block and a Bourdon spring 20 (FIGS. 3 and 4) within the gauge. Thus, the conduit 12 provides means for measuring the pressure within the cooling system of the engine.

The connection 14 provides a means of communicating the temperature of the coolant within the engine 18 to the gauge 10. The temperature indicating mechanism, as shown, is of the type which operates in accordance with the expansion and contraction of a confined gas responsive to temperature changes. It is to be understood, however, that any type of temperature indicating means may be used including the electrical types with thermocouple elements as heat sensers.

Briefly, however, the temperature indicating means shown comprises a gas containing bulb (not shown) immersed in the coolant in the engine 18. The conduit 14 connects the bulb in the engine block to the stub 24 (FIG. 4) at the back of the gauge 10 and provides communication for the gas from the bulb to a chamber 26 formed in the gauge by a movable diaphragm 28 and the back wall 29 of the gauge. Thus, as the temperature of the coolant in the engine 18 rises, the gas within the bulb expands and the increased pressure causes the diaphragm 28 to move leftwardly as viewed in FIG. 4.

The diaphragm 28 carries a button 30 as best shown in FIG. 5 which is in engagement with a crank-lever type actuator 32 journaled at 34 and 36 for rotation about its axis 38. The actuator 32 carries a lever arm 40 which engages a pin 42 carried by the gauge pointer 44. The pointer 44 is journaled for rotation about its axis 46 and the journal preferably contains a silicon fluid providing a damping action. The pointer is biased towards its left-hand zero position by means of a bowspring 50 connected to the pointer 46 and crank lever 32 at its respective ends 50a and 50b said bowspring having a tendency to close upon itself as seen in FIG. 5.

A rise in temperature will cause the diaphragm 28 to move toward the left as shown in FIG. 4, causing the button 30 to turn the crank type actuator 32. The arm 40 will be caused to move from left to right as viewed in the FIG. 5 to rotate the pointer 44 in a clockwise direction against the bias force of spring 50.

Further explanation of the temperature indicating mechanism is believed unnecessary since the type of linkage is well known in the art as may be seen in U.S. Patent 1,950,141, issued March 6, 1934, to H. Hastings. As previously noted the particular type of temperature indicating mechanism used in the gauge does not form a part of this invention.

The pressure responsive mechanism comprises a Bourdon spring 20 connected to the tubular conduit 12 as previously mentioned. Thus, the interior of the Bourdon spring is subjected to the pressure in the interior of the radiator 16. The free end 52 of the Bourdon spring carries a mounting 54 for one end of a loop-shaped link 56.

The other end of the link 56 engages a lever arm 58 which is journaled for rotation about pivot 60. A substantially V-shaped link 62 is fixed to the lever arm 58 at one end to cause it to rotate therewith. The link 62 has its other end 64 received in an elongated slot 66 defined by a second lever arm 68. Lever arm 68 is fixedly attached to a flag member 70 which is pivoted for rotation about axis 72.

The flag 70 is moved responsive to changes in pressure substantially as follows. The mechanism as shown in FIG. 3 is registering a pressure level at or below the minimum desired to be registered. An increase in pressure causes the Bourdon spring 20 to expand and increase its radius of curvature in a well known manner, thus moving its free end 52 towards the left as viewed in FIG. 3. The lever 58 is caused to rotate in a counterclockwise direction through the action of the loop-shaped link 56, and, hence, the end 64 of the linkage 62 is also moved in a counterclockwise direction. The counterclockwise motion of the link end 64 in the slot 66 of the lever arm 68 causes the flag 70 attached to the arm 68 to rotate in a clockwise direction.

The links 56 and 62 are shaped as they are to provide calibration means for the pressure indicating mechanism of the gauge. The zero position of the flag is adjusted by varying the distance between the two ends of the loop-shaped link 56. It may be seen that if the two ends of the link 56 are forced closer together the flag will be moved to a position clockwise of that shown in FIG. 3 because the counterclockwise movement of lever arm 58 will move lever arm 68 and flag 70 clockwise. An opposite displacement of the two ends of link 56 will move the flag 70 to a counterclockwise position.

The rate at which the flag 70 rotates with respect to changes in pressure is adjusted by link 62 in that the distance the end 64 of link 62 is from the axis of rotation 72 of the flag 70 the further the flag 70 will move per unit change in pressure, and vice versa for lesser distances therebetween. Thus, by varying the angle of the V-shaped link 62 the rate of travel of flag 70 may be calibrated.

The flag 70 has two contrasting colored portions 72 and 74 which may be viewed through an arcuate aperture 76 (FIG. 1) in the dial face 78 of the gauge. The arcuate aperture 76 is located along the path of the pointer 44 so that the pointer 44, dial face 78 and flag 70 visually cooperate to give an indication of safe operation of the pressure tight liquid system. The boundary 80 between the two colored portions of course defines the upper limit of the safe operating range.

The colored portion 72 is preferably green whereas the portion 74 is red to accentuate the safe and danger areas respectively. Thus, when the pointer 44 is within the range indicated by the green portion 72 of the flag, the system is operating properly whereas if the pointer is advanced to the range marked by the red portion 74 of the flag the system is overheating and the engine should be turned off.

To illustrate the operation of the gauge in practical situations assume that it is connected as shown in FIG. 1 to the radiator cooling system of a roadway construction vehicle. When the engine is first turned on the pressure in the radiator 16 and the temperature of the coolant in the engine 18 are at normal ambient values and the gauge will read as shown in FIG. 1. Now, assuming that the radiator cap 22 is properly operative to seal the radiator up to its safety level and also that there are no other leaks in the coolant system, the gauge will register as shown in FIG. 2a of the drawings after a suitable warm-up period. That is, the pressure in the radiator will build up along with the coolant temperature in the engine to cause the flag to move in a clockwise direction. The boundary 80 between the two contrasting colors on the flag will come to rest at a predetermined point relating to the normal operating pressure of the vehicle engine 18.

The temperature indicating mechanism of the gauge is calibrated to advance up to a predetermined position W under normal operating conditions and this setting is within the green colored safe operating range indicated on the flag 70. If the engine became overloaded so as to cause its temperature to rise excessively, a reading in the red range as shown at X would indicate a malfunction of the cooling system of the engine. The operator is therefore given a true warning indication to turn off the engine.

Now assume that the cooling system loses pressure for some reason, such as the malfunctioning of the seal of the radiator cap 22. The Bourdon spring 20 will move the flag 70 back to barometric pressure position as shown in FIG. 2b. If the temperature of the engine coolant is such that the pointer 44 is below the boundary 80 between the green and red portions of the flag (position Y), the vehicle operation may be maintained as long as its load does not cause the temperature to rise to the red range 74 as shown at Z. Thus, the vehicle may be kept in operation even though the pressure has been lost from the coolant system provided the temperature does not rise into the red range indicated on the flag 70.

This of course can not be done safely in a vehicle having a temperature gauge which is not responsive to pressure changes as previously described. Hence, if such a gauge has its danger range starting at the higher temperature corresponding to the maintenance of high pressure conditions, the engine may be operated inadvertently at unsafe temperatures if the coolant system loses pressure. Conversely, if the gauge has its danger range at a lower temperature corresponding to an unpressurized coolant system, valuable operating time may be lost to the vehicle when a heavier load may cause the temperature level to rise to a level which would still be safe under pressurized conditions.

Although there has been described herein a preferred embodiment of the invention, it is to be understood that many modifications and additions may be made thereto without deviating from the scope of the invention. Therefore, it is intended that the invention be bound only by the scope of the appended claims.

What is claimed is:

1. A device for indicating safe operating conditions in a pressurized, liquid-containing, radiator system, or the like, comprising a pointer mounted for rotation about a first axis, a dial face in cooperative association with said pointer and calibrated in degrees of temperature, means for causing said pointer to rotate about said first axis responsive to changes in liquid temperature, said dial face defining an arcuate aperture substantially concentric about said first axis along the path of rotation of said pointer, a flag mounted for rotation with respect to said dial face about a second axis parallel to said first axis, said flag having indicia thereon comprising two contrasting colors viewable through said aperture, and means responsive to pressure changes for rotating said flag in said system to move said contrasting colors past said aperture in a direction corresponding to the direction of movement of said pointer for respective increases or decreases of temperature and pressure.

2. A device for indicating safe operating conditions in a pressurized, liquid-containing, radiator system, or the like, comprising a movable pointer, a dial face in cooperative association with said pointer, means for causing said pointer to move with respect to said dial face responsive to changes in liquid temperature, said dial face defining an aperture along the path of said pointer, a flag mounted for movement with respect to said dial face, said flag having indicia thereon comprising two contrasting colors viewable through said aperture, a Bourdon spring, a tube affording communication between said radiator system and said Bourdon spring, linkage means between the free end of said Bourdon spring and said flag for causing said flag to move, said linkage adapted and arranged to move said contrasting colors past said aperture in a direction corresponding to the direction of movement of said pointer for respective increases and decreases of temperature and pressure.

3. A device for indicating safe operating conditions in a pressurized, liquid-containing, radiator system, or the like, comprising a movable pointer, a dial face in cooperative association with said pointer, means for causing said pointer to move with respect to said dial face responsive to changes in liquid temperature, said dial face defining an aperture along the path of said pointer, a flag mounted for movement with respect to said dial face, said flag having indicia thereon comprising two contrasting colors viewable through said aperture, and means responsive to changes in pressure in said system to move said flag and displace said contrasting colors in a direction corresponding to the direction of movement of said pointer for respective increases and decreases of temperature and pressure.

4. A device for indicating safe operating conditions in a pressurized, liquid-containing, radiator system, or the like, comprising a pointer mounted for rotation about a first axis, a dial face in cooperative association with said pointer and calibrated in degrees of temperature, means for causing said pointer to rotate about said first axis responsive to changes in liquid temperature, said dial face defining an arcuate aperture substantially concentric about said first axis along the path of rotation of said pointer, a flag mounted for rotation with respect to said dial face about a second axis parallel to said first axis, said flag having indicia thereon comprising two contrasting colors viewable through said aperture, a Bourdon spring, a tube affording communication between said radiator system and said Bourdon spring, linkage means between the free end of said Bourdon spring and said flag for causing said flag to rotate about said second axis, said linkage adapted and arranged to move said contrasting colors past said aperture in a direction corresponding to the direction of movement of said pointer for respective increases and decreases of temperature and pressure.

References Cited by the Examiner
UNITED STATES PATENTS

| | | | |
|---|---|---|---|
| 1,824,372 | 9/1931 | Schlaich | 73—345 |
| 2,239,221 | 4/1941 | Dimmock | 73—345 |
| 2,601,777 | 7/1952 | Woodward | 73—345 X |
| 3,127,771 | 4/1964 | Diehl | 73—345 |

FOREIGN PATENTS 259,312  4/1913  Germany.

LOUIS R. PRINCE, *Primary Examiner.*

D. M. YASICH, *Assistant Examiner.*